United States Patent [19]

Keogh

[11] 4,163,713

[45] Aug. 7, 1979

[54] RECOVERY OF COLOR DEVELOPER

[75] Inventor: Patrick J. Keogh, London, England

[73] Assignee: Ciba-Geigy AG, Basel, Switzerland

[21] Appl. No.: 853,605

[22] Filed: Nov. 21, 1977

[30] Foreign Application Priority Data

Dec. 9, 1976 [GB] United Kingdom ............... 51336/76

[51] Int. Cl.[2] ........................ B01D 13/00; B01D 11/00

[52] U.S. Cl. ................................ 210/22 C; 210/22 R; 210/321 A; 210/433 M; 210/500 M; 210/511; 96/55; 422/256; 422/259

[58] Field of Search .................. 210/21, 22, 23, 96 M, 210/321, 433 M, 500 M, 511; 96/48 R, 50 A, 50 R, 60 R, 63, 55; 422/256, 258, 259

[56] References Cited

U.S. PATENT DOCUMENTS 3,769,206 10/1973 Brown et al. .......................... 210/22

3,956,112 5/1976 Lee et al. .......................... 210/22 C

*Primary Examiner*—Ferris H. Lander

*Attorney, Agent, or Firm*—Sprung, Felfe, Horn, Lynch & Kramer

[57] ABSTRACT

A method for the recovery of a color developing agent of the N,N-disubstituted paraphenylene diamine type is provided. The used color developing solution is placed in a cell member which is separated from a second cell member, which contains an aqueous acid solution by a semipermeable nonporous membrane.

The semi-permeable non-porous membrane has imbibed in it an organic solvent of low water miscibility in which the color developing agent is soluble. The color developing agent diffuses through the semi-permeable non-porous membrane and forms a salt with the aqueous acid, and is then used as such.

5 Claims, 1 Drawing Figure

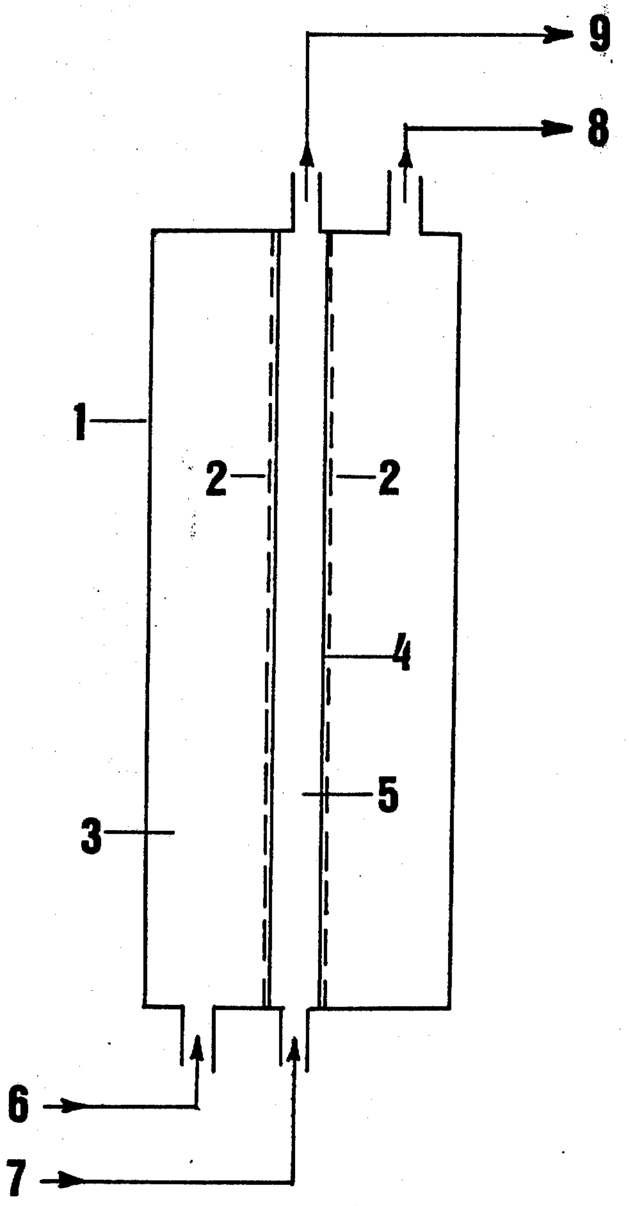
9
8
1
2
2
4
5
3
6
7

RECOVERY OF COLOR DEVELOPER

The present invention relates to the recovery of colour developing agents from used colour developing solution by using a semipermeable non-porous membrane.

Colour developing solutions which are used to develop colour photographic material having substantive colour couplers therein usually consist of an aqueous alkaline solution of a substituted paraphenylene diamine colour developing agent and a water soluble bromide such as potassium bromide together with small amounts of other substances such as antifoggants and antioxidants. On the other hand used colour developing solutions contain oxidised and sulphonated paraphenylene diamine colour developing agents, greater quantities of bromide ion, gelatin and various other substances leached out from the photographic material which has been processed therein, as well as about 80% of the original concentration of unoxidised paraphenylene diamine colour developing agent. Used colour developing solution of this type can not be employed to colour-develop photographic material due to the build up of impurities and are usually thrown away. However colour developing agents are very expensive and a method has now been discovered by means of which unoxidised colour developing agents of the paraphenylene diamine type may be recovered from used colour developing solutions compounded from the paraphenylene diamine colour developing agent.

British Patent specification 1,094,514 describes a method for removing from a fluid mixture one or several components thereof. More particularly a porous adsorbent barrier is used which contains a selective solvent to recover from the fluid mixture a certain component or components contained therein.

According to the present invention there is provided a method of recovering a colour developing agent of the N,N-disubstituted paraphenylene diamine type from a used colour developing solution which comprises placing the used colour developing solution into a cell member which is separated from a second cell member, which contains an aqueous acid solution, by a semipermeable non-porous membrane which has imbibed therein an organic solvent of low water miscibility in which the colour developing agent is soluble and allowing the colour developing agent to diffuse through the semipermeable non-porous membrane into the aqueous acid solution.

The colour developing agent in the alkaline developing solution is mainly present as the free base. It is soluble in the organic solvent, hence it becomes dissolved in the organic solvent within the membrane. A certain amount then diffuses out into the aqueous acid solution on the other side of the membrane. There it is converted to the salt form. Thus the amount of colour developing agent in the free base form is continuously kept very low in the aqueous acid solution. Thus more colour developing agent passes from the organic solvent to the aqueous acid solution.

Therefore the net effect is a continuous transferance of the colour developing agent in the free base form from the used colour developing solution, through the organic solvent-containing membrane into the aqueous acid solution where it is converted to the salt form.

A relative high concentration of colour developing agent can accumulate in the aqueous acid solution, in excess of 140 g/liter. The colour developing agent can be isolated from the aqueous acid solution by for example evaporation or salting out. However preferably the amount present is determined and the aqueous acid solution containing the colour developing agent is used to prepare fresh colour developing solution.

In the method of the present invention little oxidised colour developing agent is transferred to the aqueous acid solution or any of the other substances present in the used colour developing solution other than the colour developing agent.

The semipermeable non-porous membrane, which separates the two cells one of which contains the used colour developing solution and the other which contains the aqueous acid solution, may be self-supporting or it may be reinforced, e.g. attached to a glass sieve member or sandwiched between two glass sieve members.

Suitable material from which the semipermeable non-porous membrane may be manufactured include natural and synthetic rubbers e.g. silicone rubber and halogenated rubber, polyolefins, e.g. polyethylene, halogenated polyolefins, e.g. polyvinylchloride and polyvinylidene chloride, polyvinyl chloride/ester copolymer, polystyrene. Each of the above must have a sufficient degree of crosslinking to prevent complete disintegration in the solvent.

Suitable organic solvents in which paraphenylene diamine colour developing agents in the free base form are soluble and which have low water miscibility include aliphatic-, cycloaliphatic- and aromatic hydrocarbons such as cyclohexane, toluene, xylene, tetrahydronaphthalene, chlorinated hydrocarbons such as chloroform, trichloroethylene, 1,1,1-trichloroethane, tetrachloroethylene, chlorobenzene, as well as certain alcohols, ketones, esters and ethers, and mixtures thereof.

The solvent/membrane assembly must be chosen so that the solvent can be imbibed in the membrane but does not dissolve the membrane. Examples of suitable combinations are, polyethylene having absorbed therein xylene, trichloroethane or chloroform; polyvinylchloride having absorbed therein tetrachloroethylene, trichloroethane, trichloroethylene or xylene; polyvinylidene chloride having absorbed therein chloroform; polypropylene having absorbed therein xylene or chloroform; polystyrene cross-linked with di-vinylbenzene having absorbed therein xylene or toluene; silicone rubber having absorbed therein trichloroethane.

The preferred acid in the aqueous acid solution is sulphuric acid.

The speed of transferance of the colour developing agent per unit area of membrane from the used colour developing solution, through the membrane, into the aqueous acid solution is dependent on the concentration gradient of free base across the non-porous membrane, on the material of the non-porous membrane, on the organic solvent used, on the membrane thickness and on the temperature of the aqueous solutions, amongst other things.

Preferably the temperature of the used colour developing solution and the aqueous acid solution are each between 18° and 50° C.

The non-porous membrane should be as thin as possible consistent with mechanical strength, and preferably less than 100 microns thick.

Preferably stirring means are present both in the used colour developing solution and in the aqueous acid solution.

In one method of carrying out the process of the present invention a dialysis vessel is employed through which the used colour developing agent can be continuously pumped on one side of the non-porous membrane and through which the aqueous acid solution can be continuously pumped on the other side of the non-porous membrane. Preferably when a cell of this type is used an organic solvent of low water solubility is introduced into one of the aqueous solutions before the other one is circulated so that it is imbibed by the membrane. A small amount of this organic solvent may be present the whole time in one of the circulating aqueous solutions or a small amount of the solvent may be introduced into one or both of the aqueous solutions from time to time during the dialysis so as to ensure that sufficient solvent is present to be imbibed by the non-porous membrane.

The accompanying drawing will serve to illustrate an apparatus of use in carrying out the method of the present invention.

The FIGURE is a cross-sectioned side elevation of a dialysis vessel.

A circular vessel 1 has an outer chamber 3 and an inner circular chamber 5 therein formed by a supported semi-permeable non-porous membrane 4 composed of a sheet of a copolymer of vinyl chloride and vinyl acetate supported on a porous circular glass vessel 2. Used colour developing solution is pumped into the outer chamber of vessel 1 via inlet 6 and leaves vessel 1 via outlet 8.

An aqueous acid solution is pumped into the inner chamber 5 of 1 via the inlet 7 and leaves chamber 5 via the outlet 9.

The aqueous acid solution is a 1 molar solution of sulphuric acid in water. The thickness of the semi-permeable non-porous membrane 4 is 12.5μ. The area of 4 is 150 $cm^2$.

5 liters of used developing solutions was circulated through the chamber 3 of vessel 1. The composition of this solution was:

3 g/liter of the colour developing agent of the formula:

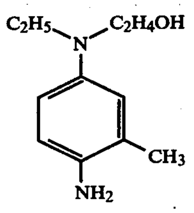

which is hereinafter referred to as CD1.

0.1 g/liter of oxidised colour developing agent
2 g/liter hydroxylamine sulphate
4 g/liter sodium sulphite (as anhydrous salt)
2 g/liter sodium bromide
20 g/liter potassium carbonate (as anhydrous salt)

1 liter of the 1 molar sulphuric acid solution was circulated through the inner chamber 5 of vessel 1.

Regular U.V. spectrophotometric analysis of the acid solution from chamber 5 showed that the CD1 was transferring across the non-porous membrane at a rate equivalent to 80 mg/hour/$m^2$ and that the dialysate was impure.

When 5 ml of methylchloroform, in which the CD1 base is soluble, was added to the acid in chamber 5 in order to wet and be absorbed by the non-porous membrane 4 and recycling of both developer and acid were continued; U.V. spectrophotometric analysis of the acid showed that the rate of transfer of CD 1 across the non-porous membrane increased almost fifty fold to a rate equivalent to 4 g/hour/$m^2$ and the dialysate possessed an absorption spectrum essentially the same as that of photographic grade CD 1. This showed the necessity of wetting the non-porous membrane with an organic solvent to obtain sufficiently pure material at a high rate of extraction.

When 10 liters of used colour developer of composition similar to that given above and 1 M sulphuric acid solution were likewise continuously recycled through the dialysis apparatus for 120 hours the non-porous membranes being wetted with methylchloroform during the whole period, U.V. spectrophotometric analysis on the 82 ml of acid extract removed from the apparatus at the end of the run, showed it to contain CD 1 at a concentration of 147 g/liter; 12 g of the original 45 g of CD 1 contained in the 10 liter of used developer had therefore diffused in 120 hours through 150 $cm^2$ of the non-porous membrane 4 representing an average rate of transfer of 6½ g/hour/$m^2$.

The U.V. absorbtion spectrum of the acid extract was esentially the same as that of an acid solution of photographic grade CD 1 and a colour developer solution compounded from a portion of the acid extract was found to be sensitometrically similar to developer compounded from photographic grade CD 1.

What we claim is:

1. A method of recovering a photographic colour developing agent of the N,N-disubstituted p-phenylenediamine type from a used colour developing solution, said recovery method being performed in a two cell system wherein each of the cell members is provided with a stirring means and is separated from the other by a reinforced, semipermeable non-porous membrane which is less than 100 microns thick and which has imbibed therein an organic solvent of low water solubility in which the colour developing agent is soluble, said membrane being composed of natural or synthetic rubbers, polyolefin, halogenated polyolefin, polyvinyl chloride/ester copolymer or polystyrene, each of which are sufficiently cross-linked to prevent complete disintegration in the organic imbibed therein, and being further attached to a glass sieve member or is sandwiched between two glass sieve members, which method comprises placing the used colour developing solution into one cell member and allowing the colour developing agent to diffuse through the semi-permeable non-porous membrane into the organic solvent and then into an aqueous acid solution present in the second cell member.

2. A method according to claim 1 wherein the organic solvent is an aliphatic-, cycloaliphatic or aromatic hydrocarbon, a chlorinated hydrocarbon, an alcohol, a ketone, an ester or a ether or mixtures thereof.

3. A method according to claim 1 wherein there is used an organic solvent/semipermeable non-porous membrane combination selected from polyethylene having absorbed therein xylene, trichloroethane or chloroform; polyvinylchloride having absorbed therein tetrachloroethylene, trichloroethane, trichloroethylene or xylene; polyvinylidene chloride having absorbed therein chloroform; polypropylene having absorbed therein xylene or chloroform; polystyrene cross-linked with di-vinylbenzene having a absorbed therein xylene or toluene; silicone rubber having absorbed therein trichloroethane.

4. A method according to claim 1 wherein the acid in the aqueous acid solution is sulphuric acid.

5. A method according to claim 1 wherein the temperatures of the colour developing solution and the aqueous acid solution are each between 18° C. and 50° C.

* * * * *